United States Patent Office 3,210,305
Patented Oct. 5, 1965

3,210,305
WAX-OLEFIN COPOLYMER COMPOSITIONS
Cyril B. Coenen and Harry F. Richards, Concord, and Robert J. Moore, Orinda, Calif., assignors to Shell Oil Company, New York, N.Y., a corporation of Delaware
No Drawing. Filed June 5, 1961, Ser. No. 114,596
2 Claims. (Cl. 260—28.5)

This invention relates to improved wax compositions. More particularly, it is concerned with the wax compositions especially suitable for coating, molding, and film forming purposes.

Petroleum derived waxes have been used for many years to coat paper and carton boards especially for use in wrapping and containing dairy products and other food products such as bakery goods as well as for coating cloth, fibers, and food products including cheese and meat to render them moisture-vapor resistant. Such waxes, however, tend to crack and peel off the coated article because of their inherent shortcomings. Even those modified with polyethylene, while having some improved properties, show disadvantages relative to brittleness and lack of tensile strength particularly under low temperature conditions.

While the addition of normally solid polyethylenes to wax may improve their tensile strength and flexibility to a limted extent, greater improvements are required in order to obtain the degree of improvement in these properties necessary or at least highly desirable for normal commercial handling of the products coated with such waxes. This is especially true for wax compositions utilized in dairy cartons and the like where waxes containing homopolymers of ethylene show relatively poor low temperature properties although these properties may be better than those of the unmodified waxes themselves.

It has been determined that the crystallization temperature of paraffin hydrocarbons is directly related to the length of the longest unbranched chain in the molecule. This general relationship holds for most of the higher molecular hydrocarbons having unbranched chain lengths within their molecules from 12 to 36 carbon atoms. Furthermore, crystallographic studies have shown that if the difference in unbranched chain lengths of two different hydrocarbons does not exceed about four carbon atoms, then a mixed crystal is formed on freezing the mixture. Hence, as the wax solidifies, such compositions containing other hydrocarbons meeting this critical relationship crystallize with wax components of the same general unbranched chain length.

Polymers involving ester groups have been utilized in waxes. However, such polymers have relatively low molecular weight on the average and the polymers are formed from monomers of an ester such as fatty acid and unsaturated alcohols. Esters of an unsaturated alcohol like vinyl alcohol possess an inherent disadvantage when they are utilized for purposes during which moisture may cause hydrolysis. Under such circumstances, a free fatty acid may be formed and cause deterioration of the material coated with the waxes containing such a polymer. Consequently, it is essential to discover dairy carton wax coating materials which will improve the physical properties of the wax forming, a principal constituent of the composition, but which at the same are not subject to hydrolysis as are polymers containing the vinyl acetate units just referred to.

Polymers showing promise in this respect comprise copolymers of ethylene with at least one higher alkene, especially propylene. While these cause substantial improvement in the properties of waxes, the degree of improvement is still of an order requiring substantial enhancement if maximum properties are to be achieved.

It is an object of this invention to provide improved wax-copolymer compositions. It is a particular object of the invention to provide the wax-copolymer compositions exhibiting unexpectedly high flexibility, toughness, elongation, and associated properties without being subject to hydrolysis in the presence of moisture. Other objects will become apparent during the following description of the invention.

Now in accordance with the present invention it has been found that certain polymers having the general linear configuration

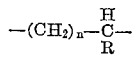

wherein $n$ is an average integer between about 10 and about 50 (preferably 10–40), R is an hydrocarbyl radical having 1–18 carbon atoms and the unit $(CH_2)_n$— is an unbranched hydrocarbon chain, the average molecular weight of the copolymers being up to about 5 million, usually between about 20,000 and 800,000 (preferably 200,000–400,000), (or expressed as intrinsic viscosity, an intrinsic viscosity of between about 1.0 and 6.0), enhance the physical properties of petroleum waxes, providing wax compositions with unexpectedly improved toughness, flexibility, tensile strength, elongation, resistance to cracking at low temperatures, and other desirable properties, preferably the polymers are copolymers of 80–95 mols of ethylene with 1 mol of a $C_{3-19}$ alpha-alkene and the intrinsic viscosity of the copolymer is between about 2 and 5. Still more preferably, the copolymers are those formed between 85–93% of ethylene and 15–7% of a $C_{3-8}$ alpha-olefin.

The compositions may be broadly divided into those in which wax largely predominated with relatively small amounts of copolymer present to modify the wax and, on the other hand, compositions in which the copolymer is present in substantially greater proportions.

In accordance with these several aspects of the invention, compositions particularly suitable for dairy carton coatings and the like but which contain major proportions of wax and only minor proportions of copolymer comprise 97.9–99.7% by weight of a hydrocarbon wax and 0.25–2.5% by weight of a copolymer of ethylene with a $C_{3-8}$ alpha-alkene, said copolymer comprising 85–95 mol percent of ethylene units and having an intrinsic viscosity of 1.1–3.5.

On the other hand, compositions comprising substantial proportions of the copolymer may comprise 40–95% by weight of a petroleum wax modified with 5–60% by weight of a copolymer of ethylene with a $C_{3-8}$ alpha olefin, said copolymer comprising 80–95 mol percent of ethylene unit and having an intrinsic viscosity of 2–5. Preferably, the higher olefin copolymerized with ethylene is propylene, but other olefin materials may be utilized in place of or in addition to propylene.

The present invention is based on the findings that the yield strength of wax-copolymer compositions is unpredictably increased by maintaining the straight chain ratio (ethylene) of the copolymers within the range specified herein before. While the yield strength is increased by adjusting the straight chain structure, the molecular weight of the copolymer does not appear to significantly effect yield strength. However, the yield strength of a wax-copolymer composition is increased by raising the concentration of a given copolymer in the composition to a maximum which will vary from one composition to the next, depending upon the particular identity of copolymer and of wax. After the maximum yield strength is achieved, then it gradually falls off with further increase in the polymer concentration to that of the pure polymer. In other words, the optimum mixtures of copolymers with wax have greater yield strength than either component alone. This behavior is not found when the unbranched portion of the copolymer is of a lower order. In such cases, the yield strength increases from a minimum to a maximum figure for the unmodified copolymer without passing through an intermediate maximum.

Other findings upon which the present invention are based are the conclusions that a high molecular weight of copolymer greatly increases flexibility of the resulting wax-copolymer compositions while the proportion of the straight-chain segments in the copolymer strongly influences yield strength. Maximum flexibility and yield strength are realized with polymers of high molecular weight and a minimum amount of branching, as long as the proportions of branching and of molecular weight (defined, for example, by means of intrinsic viscosity) are within the limits defined above. If extremes are investigated, it is found that high molecular weight homopolymeric ethylene when combined with wax results in a very brittle composition. The limited proportion of branching permitted by the copolymers defined herewith results in a profound improvement in the wax-copolymer composition.

The polymers utilized in the compositions of this invention are preferably prepared by copolymerizing a mixture of ethylene and a higher alpha alkene, preferably having from 3–8 carbon atoms per molecule but which may have as many as 18 carbon atoms per molecule. The most effective alpha olefins for this purpose are propylene and butene-1, although higher alkenes such as octene-1 or octadecene-1 may be utilized in place of or in addition to the lower alpha olefins.

While the process of forming the copolymers does not form a part of the present invention, the copolymers may be prepared by well known procedures, such as catalytic polymerization. The proportion of catalyst should be in the order of 0.01–1%, the polymerization being carried out in an inert solvent such as an alkane (heptane). Polymerization in this manner is normally conducted under low pressures in the order of 1–30 p.s.i.g., temperatures of 0–100° C., for a time of 1–5 hours.

Catalytic systems which may be used include combinations of aluminum alkyl chlorides such as aluminum diethyl monochloride with trialkyl vanadates, exemplified by tri-isopropyl vanadate, or "ethyl aluminum sesquichloride" $(Al)_2(C_2H_5)_3Cl_3$. Other vanadates include tri-secondary butyl vanadate or mixed isopropyl secondary butyl vanadates.

Polymers having the general formula

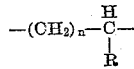

may be prepared by other means, such as copolymerization of unsubstituted diolefins, such as butadiene, with alkyl-substituted diolefins, such as isoprene, and hydrogenation of the copolymer to eliminate any remaining unsaturated linkages. Hydrocarbyls other than alkyls are obtained by the use of styrene or alkylated styrenes in place of $C_{3-20}$ aliphatic olefins.

The density of the copolymers may be varied over a considerable range usually between about 0.85 to about 1.0, low density copolymers being regarded as those having densities in the order of 0.85 to about 0.91 and high density materials being regarded as those having densities from the latter upper limit to about 1.0. Advantages are gained by the combination of several different degrees of high and low density and/or high and low molecular weight insofar as increase in low temperature properties without a corresponding increase in brittleness being experienced.

The precise mol ratio of ethylene to higher alkene will depend in a large part upon the exact type of wax being modified with the copolymer. It appears to be necessary or at least highly desirable to coordinate the unbranched chain length of the individual wax molecules with the unbranched chain length of the polymer employed. The degree of branching in the copolymer is established by the mol ratio of ethylene to higher alkene. Since petroleum waxes contain a spectrum of wax species, it is desirable to have a limited spectrum of unbranched chain units in the copolymer to coordinate with the several wax species present in the normal petroleum wax. An example of such a wax spectrum is to be found in the figures of Arabian patent, U.S. 2,915,447 and in Table II of said patent. Therein it will be seen that a paraffin wax having an average melting point of 123° F. contains about 86 mol percent of normal paraffins having from 22 to 27 carbon atoms per molecule. On the other hand, a paraffin wax having an average melting point of about 139° F. contains about 72 mol percent of waxes having from 26 to 31 carbon atoms per molecule.

The waxes which may be modified with the subject copolymers are pretroleum waxes referred to in the art as paraffin wax or as microcrystalline wax. Microcrystalline wax is also known as amorphous wax and is obtained by the dewaxing of residual lubricating oils while the paraffin waxes are usually obtained by the dewaxing of distillate lubricating oil fractions. Distillate paraffin waxes usually have melting points between about 120° F. and about 145° F., preferably between about 125 and 140° F. Microcrystalline waxes which contain only minor amounts of normal paraffins and largely predominate in highly branched and naphthenic waxes have melting points in the order of 130–160° F., usually between 140 and 150° F.

Two higher melting point paraffin waxes are especially useful in many coating wax compositions: heavy distillate waxes obtained from the highest boiling distillate lubricating oil fractions by dewaxing have melting points in the order of 145 and 185° F., as does the high melting point paraffin wax split from microcrystalline wax by fractional crystallization.

Special waxes may be obtained in particular instances, such as the plastic wax obtained by the deoiling of soft wax fractions which normally are separated from paraffin waxes during deoiling and dewaxing procedures. These plastic waxes are useful for their extreme flexibility and, while useful for this particular property, are especially subject to being fortified with respect to blocking and tensile strength as well as toughness by incorporation with the subject copolymers.

It is normal experience in designing wax coating compositions to find it necessary to combine several waxes together in a single composition. The purpose of this, of course, is to obtain the beneficial properties inherent in each particular type of wax or to minimize adverse properties of other waxes so included.

Suitable compositions containing relatively small amounts of the subject copolymers preferably comprise the following composition:

| | Percent weight |
|---|---|
| Paraffin wax, 122–142° F. melting point | 40–60 |
| Heavy distillate wax, 142–185° F. melting point | 5–20 |
| Microcrystalline wax, 130–160° F. melting point | 10–20 |
| Plastic wax, 120–155° F. melting point | 25–40 |
| Copolymers as described above | 0.1–5 |

For wax compositions having maximum toughness and extreme flexibility as well as other corresponding properties, various proportions of any of the wax components may be replaced with copolymer, preferably a copolymer having an average molecular weight about 50–500 times the average molecular weight of the wax composition. Suitable compound waxes of this category may have the following composition:

| | Percent weight |
|---|---|
| Paraffin wax, 122–142° F. melting point | 40–60 |
| Heavy distillate wax, 142–185° F. melting point | 5–10 |
| Microcrystalline wax, 130–160° F. melting point | 5–15 |
| Plastic wax | 0–20 |
| Copolymer | 5–50 |

Copolymers of the invention may be dispersed in wax simply by heating and stirring the several components until a single phase melt is obtained. They may be coated on any surface such as carton board, paper, cloth, cellophane, polyethylene, or other surface where moisture proofing and vapor impermeability is desirable in addition to the coextensive properties such as extreme flexibility and yield strength.

Another method of dispersing the copolymer in wax comprises forming a soltuion of the copolymer in a relatively volatile solvent, such as heptane, benzene (or a chlorinated hydrocarbon solvent) and adding molten wax or a solution of wax thereto. The mixture is then cooled and the solvent removed by evaporation or steam stripping. This method produces reasonably homogeneous compositions and does not subject the components to the adverse effect of heat which may occur in the hot melt procedure referred to hereinafter.

Another method of compounding the compositions of this invention may be referred to as "mill mixing." In this method, the copolymer is heated on a compounding roll or a set of rolls and the wax is added while the copolymer is being rolled. The temperature is gradually lowered to obtain an essentially solid composition when the temperature is sufficiently reduced. An improvement on this comprises the so-called "extrusion mixing" of compositions prepared by any of the above methods whereby the composition is subjected to extrusion pressures which cause greater inter-mixing than can be obtained by any of the methods just described.

The most desirable catalysts are vanadium esters having the general formula $VO(OR)_3$ wherein R represents a lower hydrocarbyl radical preferably having less than about 8 carbon atoms each and still more preferably 1–4 carbon atoms each. Specific catalysts for this purpose include the ethyl isopropyl secondary butyl or tertiary butyl esters. These are combined with the co-catalysts aluminum dialkyl chloride or the corresponding sesqui chloride. Preferably, the co-catalysts are employed in ratios of aluminum to vanadium of 3 to 1 to about 20 to 1 mols.

The copolymerization is normally conducted in an inert solvent such as heptane or other alkane or in an inert aromatic hydrocarbon such as benzene or toluene at temperature between about 25° and about 60° C., the pressure varying from about atmospheric to about 55 p.s.i.g. Under these conditions the intrinsic viscosity (determined in decalin at 150° C.) usually varied from about 1 to about 6, the molecular weight by osmometry varying from about 5000 to 100,000 to about 700,000 and molecular weight as determined by light scattering methods being essentially these numerical limits.

The compositions of this invention are useful not only in film or extrusion coating compositions, for dairy carton boards, paper, metal and the like but also may be employed for wax polish compositions (either solution or emulsion form), in printing inks, films and molded articles where high temperature is not critical. Particular uses include freezer accessories, fruit baskets, disposable containers of various types, and toys, as well as wood and cardboard coatings. Likewise, the compositions are useful in the preparation of adhesives for plywood or for paperboards.

The following examples illustrate the properties to be obtained in accordance with the compositions for this invention.

EXAMPLE I

Blends were prepared of 30% by weight of various polymers with 70% by weight of a paraffin wax having a melting point of about 85° C. Table I outlines the data obtained with respect to tensile strength, elongation and hardness obtained upon these samples.

*Table I*

[Blends of 30% polymer+70% paraffin wax, M.P. 172° F.]

| Polymer | Percent $C_2$ | Intrinsic Viscosity | Yield Strength (p.s.i.) | Tensile at Break (p.s.i.) | Percent Elongation at Break | Hardness, Shore A |
|---|---|---|---|---|---|---|
| $C_2/C_3$ | 92 | 1.73 | 905 | 900 | 37 | 90 |
| $C_2/C_3$ | 90.5 | 2.6 | 842 | 946 | 586 | 93 |
| $C_2/C_3$ | 89.5 | 2.56 | 636 | 1,422 | 726 | 96 |
| $C_2/C_3$ | 89.5 | 1.9 | 615 | 656 | 488 | 94 |
| $C_2/C_3$ | 89 | 2.3 | 744 | 1,346 | 807 | 92 |
| $C_2/C_3$ | 88 | 2.71 | 705 | 1,711 | 813 | 96 |
| $C_2/C_3$ | 87.5 | 2.42 | 765 | 1,834 | 760 | 95 |
| $C_2/C_3$ | 86.5 | 3.0 | 692 | 1,421 | 809 | 90 |
| $C_2/C_3$ | 85 | 5.9 | 602 | 812 | 923 | 93 |
| $C_2/C_3$ | 88.0 | 1.42 | 703 | 666 | 67 | 94 |
| $C_2/C_3$ | 87.5 | 1.16 | 677 | 610 | 75 | 93 |
| $C_2/C_3$ | 84 | .86 | 528 | 440 | 18 | 83 |
| $C_2/C_3$ | 81 | .45 | 459 | 415 | 8.5 | 79 |
| Ethylenevinyl acetate copolymer | 88 | .75 | 720 | 593 | 74 | 93 |
| $C_3$ | | 2.5 | 258 | | 1 | 94 |
| $C_5$ | (polyisoprene) | | 379 | | 3.8 | |
| $C_2$ | | | 487 | | 4.4 | 94 |
| $C_2$ | | | 447 | | 3.0 | 93 |
| $C_2$ | | | 699 | | 2.1 | 98 |

1. *Intrinsic viscosity* is the limiting reduced viscosity as the concentration approaches zero, $$\left(\frac{\eta - \eta_0}{\eta_0 C}\right) C \to 0$$

where:
$\eta$ = viscosity of blend in centistokes
$\eta_0$ = viscosity of solvent
$C$ = concentration of solute in grams/deciliter $\frac{\eta - \eta_0}{\eta_0}$ = specific viscosity ($\eta sp$)

$\frac{\eta sp}{C}$ = reduced viscosity ($\eta red$)

The intrinsic viscosity is the value obtained by extrapolating, to zero concentration, a series of reduced viscosities obtained for solutions of different concentrations.

2. *Yield strength, Tensile strength, and percent elongations* were obtained on Instron Machine using standard "D" dies employing standard ASTM D638–52T procedure with 2.0 in./min. separation rate.

3. *Hardness test.*—Shore "A" hardness obtained using standard ASTM D676–49T test.

It will be seen in Table I that only those compositions in which the polymer has at least about 85 mol percent of ethylene and an intrinsic viscosity in excess of 1.0 gave satisfactory results with respect to tensile strength, elongation and hardness. The other compositions containing copolymers lying outside the area claimed herewith and the homopolymeric polypropylene and polyethylenes were deficient in one or more of the properties tested.

EXAMPLE II

Compositions were axamined which contained no more than about 1% by weight of various copolymers, the balance of the composition being a dairy carton wax comprising a mixture of paraffin waxes and microcrystalline wax.

The criterion employed in studying these compositions, which were designed for the coating of dairy carton boards, is the tendency of the boards so coated to crack when subjected to impact at storage temperatures such as those to be expected in the storage of dairy products. For this purpose, a water-filled quart sized milk carton was subjected to a sudden impact at 45° F. Performance in the test was judged by the total number of inches of cracks which formed in the waxed bottom of the container. Table II illustrates the comparative results obtained in this test.

Table II.—Milk carton wax blends

| Polymer | Percent C$_2$ | Intrinsic Viscosity | Polymer Conc. in Wax | Impact, Inches of Cracks |
|---|---|---|---|---|
| Base Wax | | | 0 | 30 |
| C$_2$/C$_3$ | | 1.16 | 1.0 | 3 |
| | | | 0.5 | 8 |
| | | | 0.25 | 9 |
| C$_2$/C$_3$ | 88 | 1.42 | 1.0 | 2 |
| | | | 0.5 | 8 |
| | | | 0.25 | 5 |
| C$_2$/C$_3$ | 81.5 | .96 | 1.0 | 10 |
| C$_2$/C$_3$ | 84 | .86 | 1.0 | 8 |
| | | | 0.5 | 22 |
| C$_2$/C$_3$ | 81 | .45 | 1.0 | 19 |
| C$_2$ (DYDT) | 100 | | 1.0 | 7 |
| | | | 0.5 | 14 |

Wax Composition (percent by weight):
    Microcrystalline wax ---------------------------------- 45
    Paraffin wax, 136–138° F., M.P. ----------------------- 15
    Heavy distillate paraffin wax ------------------------- 10
    Isoparaffin-naphthenic wax ---------------------------- 30

It will be seen that blends containing copolymers falling within the scope of the present invention are superior to compositions containing homopolymeric polyethylene.

EXAMPLE III

The effect of polymer concentration upon elongation of wax-copolymer compositions was studied utilizing a polymer falling within the scope of the present invention (polymer No. 1) and a copolymer lying outside the limits of the copolymers of this invention (polymer No. 2). According to Table III, below, it will be seen that the compositions utilizing the copolymers of the present invention are far more effective for a given concentration of copolymer than those containing the unclaimed type of polymer.

Table III.—Effect of polymer concentration on elongation

| Polymer Concentration | Percent Elongation | |
|---|---|---|
| | Polymer No. 1 [a] (Of the Invention) | Polymer No. 2 [b] (Outside of Invention) |
| 5 | 50 | |
| 20 | 660 | |
| 30 | 910 | 21 (50%) [c] |

[a] Polymer No. 1 = C$_2$/C$_3$ copolymer, 85 mol percent C$_2$, 700,000 mol wt.
[b] Polymer No. 2 = C$_2$/C$_3$ copolymer, 74.5 mol percent C$_2$, 140,000 mol wt.
[c] At concentrations of polymer No. 2 less than 50%, elongations were less than 5%.

MOLECULAR WEIGHT DETERMINATION $$[\eta] = K M_w^\alpha$$

(1) K and $\alpha$ are constants particular to the series.
(2) $[\eta]$ = intrinsic viscosity.

The viscosity-average molecular weight, $M_v$ is obtained from viscosity determinations employing the above equation. The correlation between $M_v$ and $M_w$ (weight average molecular weight) is a fairly linear one for polymers of normal distribution. $M_w$ is determined via light scattering techniques. Therefore a plot of log $M_w$ against log $[\eta]$ is made.

METHOD OF DETERMINATION OF PERCENT ETHYLENE CONTENT

Thin films of the polymers are cast from dilute solutions (1% in tetrachloroethylene, benzene or heptane) or to NaCl plates. The infrared spectrum is obtained. The log ratio of the 7.25$\mu$ methyl vibration to that of the 6.8$\mu$ methylene vibration is obtained. The value will vary depending upon the percent propylene in the ethylene propylene copolymer. A plot of this log ratio is then made against percentage composition.

The percent C$_2$ of a particular polymer may be obtained from tagged C$_{14}$ experiments, utilizing labeled ethylene or propylene, to relate the actual C$_2$ content to the log ratio.

If extinction coefficients are known, one may use quantitative solutions for infrared analysis and obtain the plot in a like manner.

We claim as our invention:

1. A composition of matter consisting essentially of 40–95% by weight of a petroleum wax and 5–60% by weight of a copolymer of ethylene and propylene, said copolymer comprising 80–95 mol percent of ethylene units and having an intrinsic viscosity of 2–5.

2. A composition of matter consisting essentially of 40–95% by weight of a petroleum wax and 5–60% by weight of a copolymer of ethylene and propylene, said copolymer comprising 85–93 mol percent of ethylene units and having an intrinsic viscosity of 2–5.

References Cited by the Examiner

UNITED STATES PATENTS 2,726,231  12/55  Field et al. ----------- 260—88.2
2,728,735  12/55  Anderson ------------- 260—28.5
3,157,610  11/64  Richardson ----------- 260—28.5

MORRIS LIEBMAN, *Primary Examiner.*

MILTON STERMAN, ALEXANDER H. BRODMERKEL, *Examiners.*